United States Patent
Kim et al.

(10) Patent No.: US 10,579,047 B2
(45) Date of Patent: Mar. 3, 2020

(54) APPARATUS AND METHOD FOR VERIFYING AND CORRECTING DEGREE OF 3D-PRINTED JOINTS MOVEMENT

(71) Applicant: Electronics and Telecommunications Research Institute, Daejeon (KR)

(72) Inventors: Kap-Kee Kim, Daejeon (KR); Il-Kyu Park, Daejeon (KR); Chang-Joon Park, Daejeon (KR); Jin-Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 15/974,898

(22) Filed: May 9, 2018

(65) Prior Publication Data
US 2018/0348737 A1    Dec. 6, 2018

(30) Foreign Application Priority Data
Jun. 1, 2017    (KR) ........................ 10-2017-0068444

(51) Int. Cl.
*G05B 19/4099*    (2006.01)
*B29C 64/393*    (2017.01)
(Continued)

(52) U.S. Cl.
CPC ........ *G05B 19/4099* (2013.01); *B29C 64/393* (2017.08); *B33Y 50/02* (2014.12); *B33Y 80/00* (2014.12); *G06T 17/20* (2013.01); *B33Y 10/00* (2014.12); *B33Y 30/00* (2014.12); *G05B 2219/49007* (2013.01)

(58) Field of Classification Search
CPC ...... G05B 19/4099; B33Y 50/02; B33Y 80/00
See application file for complete search history.

(56) References Cited

U.S. PATENT DOCUMENTS

2009/0153553 A1*  6/2009  Kim ........................ G06T 13/40
                                                              345/419
2016/0176116 A1*  6/2016  Hwang .............. G05B 19/4099
                                                              700/98
(Continued)

FOREIGN PATENT DOCUMENTS

KR         101527953 B1      6/2015
KR        1020160143487 A    12/2016

OTHER PUBLICATIONS

Moritz Bächer et al., "Fabricating articulated characters from skinned meshes," ACM Transactions on Graphics (TOG), Jul. 2012, vol. 31 Issue 4, Article No. 47.

*Primary Examiner* — Vincent H Tran
(74) *Attorney, Agent, or Firm* — William Park & Associates Ltd.

(57) ABSTRACT

Disclosed herein are an apparatus and method for verifying and correcting degree of 3D-printed joints movement. A method for correcting a print position of a three-dimensional (3D) object is performed by a 3D object print position correction apparatus, and includes setting at least one adjacent mesh of a 3D object in which multiple shells are connected to each other through a joint structure, calculating movement degree information for the joint structure of the 3D object using the set adjacent mesh, and correcting a print position of the 3D object such that the print position matches the calculated movement degree information.

20 Claims, 7 Drawing Sheets

(51) Int. Cl.
*G06T 17/20* (2006.01)
*B33Y 50/02* (2015.01)
*B33Y 80/00* (2015.01)
*B33Y 10/00* (2015.01)
*B33Y 30/00* (2015.01)

(56) References Cited

U.S. PATENT DOCUMENTS

2016/0274830 A1  9/2016  Jang et al.
2016/0283616 A1* 9/2016  Shintani .............. G06F 17/5018
2016/0354980 A1  12/2016 Ho et al.
2017/0015062 A1  1/2017  Kim et al.
2019/0217545 A1* 7/2019  Eller .................... B29C 64/106

\* cited by examiner

APPARATUS AND METHOD FOR VERIFYING AND CORRECTING DEGREE OF 3D-PRINTED JOINTS MOVEMENT

CROSS REFERENCE TO RELATED APPLICATION

This application claims the benefit of Korean Patent Application No. 10-2017-0068444, filed Jun. 1, 2017, which is hereby incorporated by reference in its entirety into this application.

BACKGROUND OF THE INVENTION

1. Technical Field

The present invention relates generally to technology for correcting the print position of a three-dimensional (3D) object, and more particularly, to technology for verifying the motion of a 3D object in which multiple shells are connected to each other through a joint structure and correcting the joints print position of the 3D object.

2. Description of the Related Art

Generally, 3D output uses a scheme in which portions connected to active joints are printed and are assembled. Here, after joint portions are separately printed, they may be assembled. Alternatively, portions (male/female portions) connected to joints may be respectively outputted and assembled.

When 3D output is assembled using conventional technology, there may occur the case where joint portions are broken when the two ends of each joint are assembled, and thus a joint function is lost. Further, according to the structure of joints, it may be impossible to assemble joint portions after 3D output has been printed. In order to solve this problem, a scheme for printing, at one time, the entire 3D object, into which active joints are inserted, may also be used.

When the entire 3D mesh object into which active joints are inserted is printed at one time using existing 3D printing software, the 3D mesh object cannot reflect physical properties related to the motion of the joints of 3D output. That is, the shape of the 3D output seems to be identical to the 3D mesh model, but functionality related to the motion of the actual 3D output cannot be determined. Due thereto, whether a 3D mesh object reflects the motion functionality desired by a user may be determined only after the 3D mesh object has been 3D-printed.

Therefore, there is a need to develop technology that can predict the extent of motion after the printing of a 3D mesh object, automatically adjust the 3D mesh object based on effective intervals for 3D printing, and print a 3D object composed of multiple shells at one time. In connection with this, Korean Patent Application Publication No. 10-2016-0143487 (Date of Publication: Dec. 14, 2016) discloses a technology related to "Three-dimensional printing apparatus and method for calibrating printing inaccuracy thereof."

SUMMARY OF THE INVENTION

Accordingly, the present invention has been made keeping in mind the above problems occurring in the prior art, and an object of the present invention is to determine, at a 3D mesh model step, whether a 3D mesh object reflects the motion functionality desired by a user.

Another object of the present invention is to provide 3D output that enables a user's desired motion to be implemented by forming intervals between active joints of multiple shells.

A further object of the present invention is to predict the extent of motion of a 3D object before the 3D object is printed by a 3D printer.

Yet another object of the present invention is to geometrically and automatically transform a 3D object based on intervals supported by a 3D printer.

In accordance with an aspect of the present invention to accomplish the above objects, there is provided a method for correcting a print position of a three-dimensional (3D) object, the method being performed by a 3D object print position correction apparatus, the method including setting at least one adjacent mesh of a 3D object in which multiple shells are connected to each other through a joint structure, calculating movement degree information for the joint structure of the 3D object using the set adjacent mesh, and correcting a print position of the 3D object such that the print position matches the calculated movement degree information.

Setting the adjacent mesh of the 3D object may be configured to set the adjacent mesh for a joint portion between a first shell and a second shell.

Setting the adjacent mesh of the 3D object may include slicing the 3D object along at least one of an X axis, a Y axis, and a Z axis, measuring an interval between the first shell and the second shell at a section of the sliced 3D object, and setting the adjacent mesh by comparing the measured interval with a preset effective interval.

Setting the adjacent mesh may include setting at least one of an index of the adjacent mesh, indices of vertices corresponding to the adjacent mesh, coordinates of the vertices corresponding to the adjacent mesh, and a sequence of the indices of the vertices.

The effective interval may be set based on a printing precision of a 3D printer.

Calculating the movement degree information may be configured to calculate the movement degree information based on at least one of a distribution and a size of the set adjacent mesh.

Calculating the movement degree information may include calculating a first translation matrix, which is a translation matrix for each adjacent mesh, and calculating a second translation matrix, which is a translation matrix for each shell.

Calculating the second translation matrix may be configured to calculate the second translation matrix for at least one of a first shell and a second shell based on a distribution of the first translation matrix.

Correcting the print position of the 3D object may be configured to correct positions of vertices corresponding to each shell based on the first translation matrix and the second translation matrix.

The method may further include converting mesh data of the 3D object, the print position of which is corrected, into toolpath information, and transmitting the toolpath information to a 3D printer.

In accordance with another aspect of the present invention to accomplish the above objects, there is provided an apparatus for correcting a print position of a three-dimensional (3D) object, including an adjacent mesh (shell) setting unit for setting at least one adjacent mesh of a 3D object in which multiple shells are connected to each other through a joint structure, a joint movement degree estimation unit for calculating movement degree information for the joint structure of the 3D object using the set adjacent mesh, and a print position correction unit for correcting a print position of the 3D object such that the print position matches the calculated movement degree information.

The adjacent mesh (shell) setting unit may set the adjacent mesh for a joint portion between a first shell and a second shell.

The adjacent mesh (shell) setting unit may slice the 3D object along at least one of an X axis, a Y axis, and a Z axis, measure an interval between the first shell and the second shell at a section of the sliced 3D object, and set the adjacent mesh by comparing the measured interval with a preset effective interval.

The adjacent mesh (shell) setting unit may set at least one of an index of the adjacent mesh, indices of vertices corresponding to the adjacent mesh, coordinates of the vertices corresponding to the adjacent mesh, and a sequence of the indices of the vertices.

The effective interval may be set based on a printing precision of a 3D printer.

The joint movement degree estimation unit may calculate the movement degree information based on at least one of a distribution and a size of the set adjacent mesh.

The joint movement degree estimation unit may calculate a first translation matrix, which is a translation matrix for each adjacent mesh, and calculate a second translation matrix, which is a translation matrix for each shell.

The joint movement degree estimation unit may calculate the second translation matrix for at least one of a first shell and a second shell based on a distribution of the first translation matrix.

The print position correction unit may correct positions of vertices corresponding to each shell based on the first translation matrix and the second translation matrix.

The apparatus may further include a 3D printer control unit for converting mesh data of the 3D object, the print position of which is corrected, into toolpath information and transmitting the toolpath information to a 3D printer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
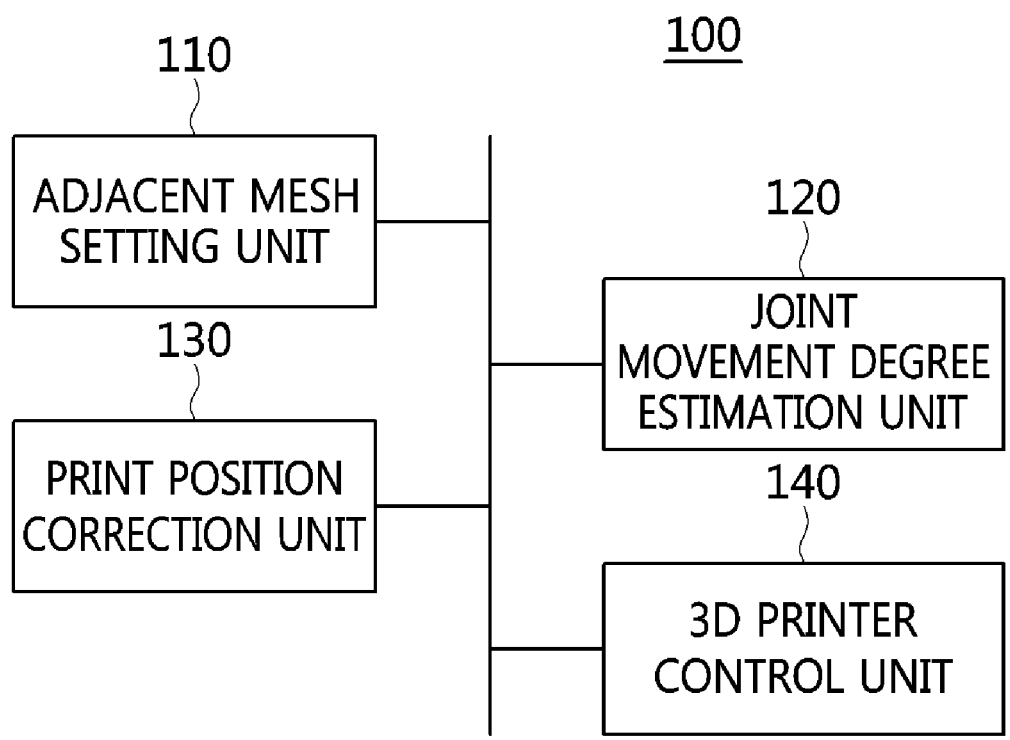
FIG. 1 is a block diagram illustrating the configuration of an apparatus for correcting the print position of a 3D object according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a block diagram illustrating the configuration of an apparatus for correcting the print position of a 3D object (hereinafter referred to as a "3D object print position correction apparatus") according to an embodiment of the present invention.

As illustrated in FIG. 1, a 3D object print position correction apparatus 100 may include an adjacent mesh (shell) setting unit 110, a joint movement degree estimation unit 120, a print position correction unit 130, and a 3D printer control unit 140.

First, the adjacent mesh (shell) setting unit 110 may set at least one adjacent mesh of a 3D object in which multiple shells are connected to each other through a joint structure. Here, the 3D object may be a 3D mesh object, that is, data composed of vertices and edges, and may be composed of one or more files depending on the structure of joints. In this case, the adjacent meshes may correspond to joints movement.

When the 3D object has a shape in which a first shell and a second shell are connected to each other through a joint structure, the adjacent mesh (shell) setting unit 110 may set one or more adjacent meshes for joint portions of the first shell and the second shell. When an interval between the first mesh of the first shell and the second shell is less than a preset effective interval, the adjacent mesh (shell) setting unit 110 may set the first mesh as an adjacent mesh.

Also, the adjacent mesh (shell) setting unit 110 may slice the 3D object along any one of an X axis, a Y axis, and a Z axis, and may measure an interval between the first shell and the second shell at the section of the sliced 3D object. Further, the adjacent mesh (shell) setting unit 110 may compare the measured interval with a preset effective interval, and may set a mesh corresponding to the measured interval as an adjacent mesh when the measured interval is less than the effective interval.

Here, the effective interval may be set based on the printing precision of the 3D printer that 3D-prints a 3D object, and may be set through experiments. Also, the effective interval may be set depending on the resolution of the 3D printer, the 3D printing material used thereby, etc.

In addition, the adjacent mesh (shell) setting unit 110 may set at least one of the index of each adjacent mesh, the indices of vertices corresponding to the adjacent mesh, the coordinates of the vertices corresponding to the adjacent mesh, and the sequence of the vertex indices.

The adjacent mesh (shell) setting unit 110 may slice the 3D object for each of the X axis, Y axis, and Z axis, may measure intervals between shells at respective sliced sections, and may set adjacent meshes based on effective intervals respectively set for the X axis, Y axis, and Z axis. The procedure in which the adjacent mesh (shell) setting unit 110 designates the adjacent meshes by slicing the 3D object will be described in detail later with reference to FIG. 3.

The joint movement degree estimation unit 120 calculates movement degree information for the joint structure of the 3D object using the set adjacent meshes. When the 3D object is printed by the 3D printer, the joint movement degree estimation unit 120 may calculate movement degree information by predicting the extent (degree) of motion of the shells constituting the 3D object, provide the calculated movement degree information to the user, and receive revision information related to the movement degree information from the user. In this case, the movement degree information may be information on degree of the movement of the joint structure for smooth joints movement.

The joint movement degree estimation unit 120 may calculate the movement degree information based on at least one of the distribution and size of the set adjacent meshes. The joint movement degree estimation unit 120 may calculate the distribution and size of adjacent meshes corresponding to respective sections of the X axis, the Y axis, and the Z axis, and may obtain the movement degree information of the 3D object based on the results of calculation.

In particular, the joint movement degree estimation unit 120 may obtain movement degree information for the shells of the 3D object by calculating first translation matrices, which are translation matrices for respective adjacent meshes, and by calculating second translation matrices, which are translation matrices for respective shells. Here, the second translation matrices may be calculated based on the distribution of the first translation matrices, and the joint movement degree estimation unit 120 may calculate a second translation matrix for at least one of the first shell and the second shell.

The procedure in which the joint movement degree estimation unit 120 calculates movement degree information for the joint structure of the 3D object will be described in detail later with reference to FIG. 6.

Next, the print position correction unit 130 may correct the print position of the 3D object so that the print position matches the calculated movement degree information. In this case, the correction of the print position may be for proper (smooth) joints movement. That is, the print position correction unit 130 may correct the positions of vertices corresponding to the shells based on the first translation matrices and the second translation matrices.

Finally, the 3D printer control unit 140 may convert mesh data of the 3D object, the print position of which is corrected, into toolpath information. The 3D printer control unit 140 may transmit the converted toolpath information to the 3D printer.

The 3D printer control unit 140 may convert the 3D object having a mesh data format composed of vertices and edges into toolpath information, and may then allow the 3D printer to read the toolpath information from memory or a file and to perform 3D printing.

For convenience of description, the 3D object print position correction apparatus 100 has been described as being implemented as a device separate from the 3D printer, and the 3D printer control unit 140 has been described as transmitting the toolpath information to the 3D printer. However, the present invention is not limited thereto, and the 3D object print position correction apparatus 100 may also be implemented as a module included in the 3D printer.

Hereinafter, a method for correcting the print position of a 3D object, performed by the 3D object print position correction apparatus, according to an embodiment of the present invention will be described in detail with reference to FIGS. 2 to 6.

Figure 2:
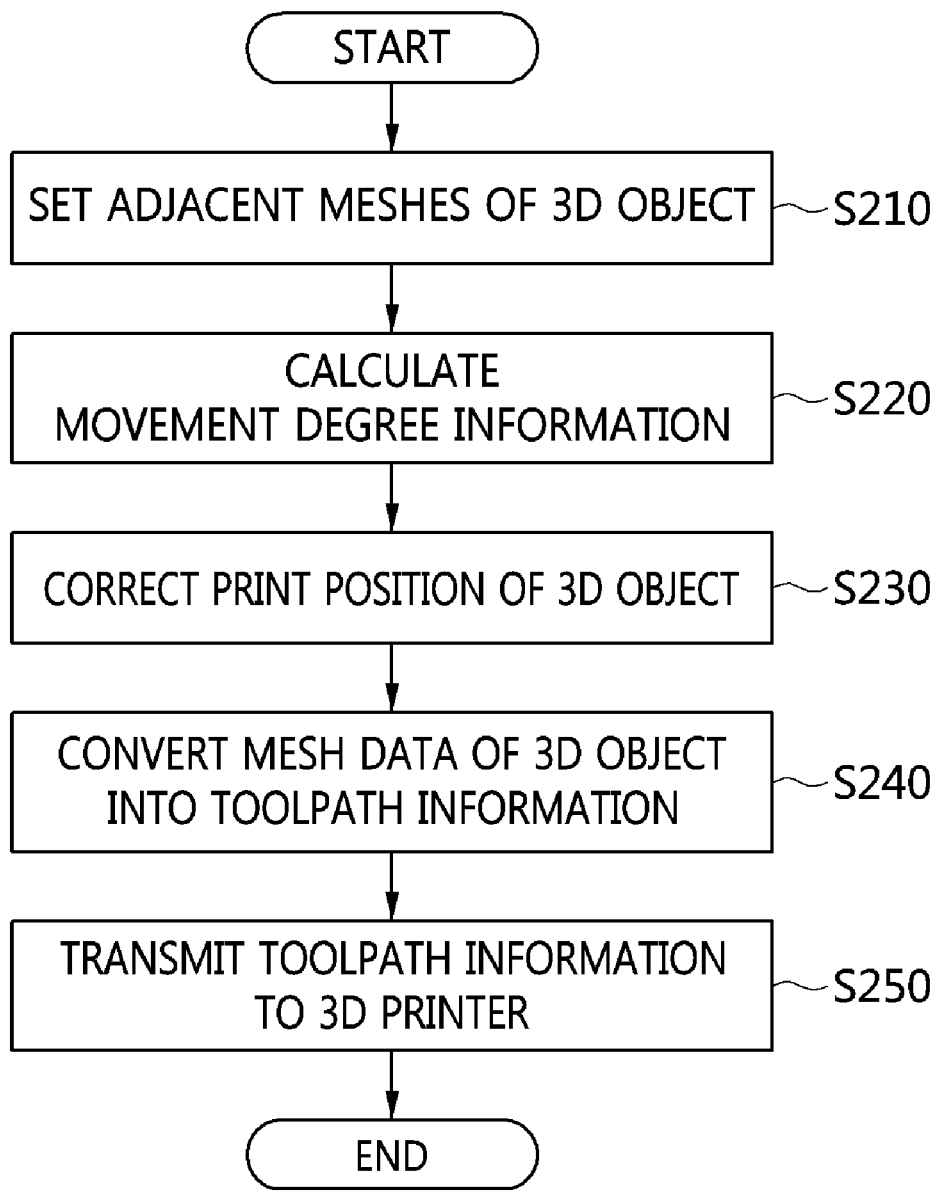
FIG. 2 is a flowchart illustrating a method for correcting the print position of a 3D object according to an embodiment of the present invention.

FIG. 2 is a flowchart illustrating a method for correcting the print position of a 3D object (hereinafter referred to as a "3D object print position correction method") according to an embodiment of the present invention.

First, the 3D object print position correction apparatus 100 sets adjacent meshes of the 3D object at step S210.

The 3D object print position correction apparatus 100 sets adjacent meshes for joint regions corresponding to multiple shells that constitute the 3D object. For example, when a first shell and a second shell are connected to each other through a joint structure, the 3D object print position correction apparatus 100 may set the adjacent meshes by comparing an interval between meshes corresponding to the two shells with a preset effective interval in joint regions of the first shell and the second shell.

Figure 3:
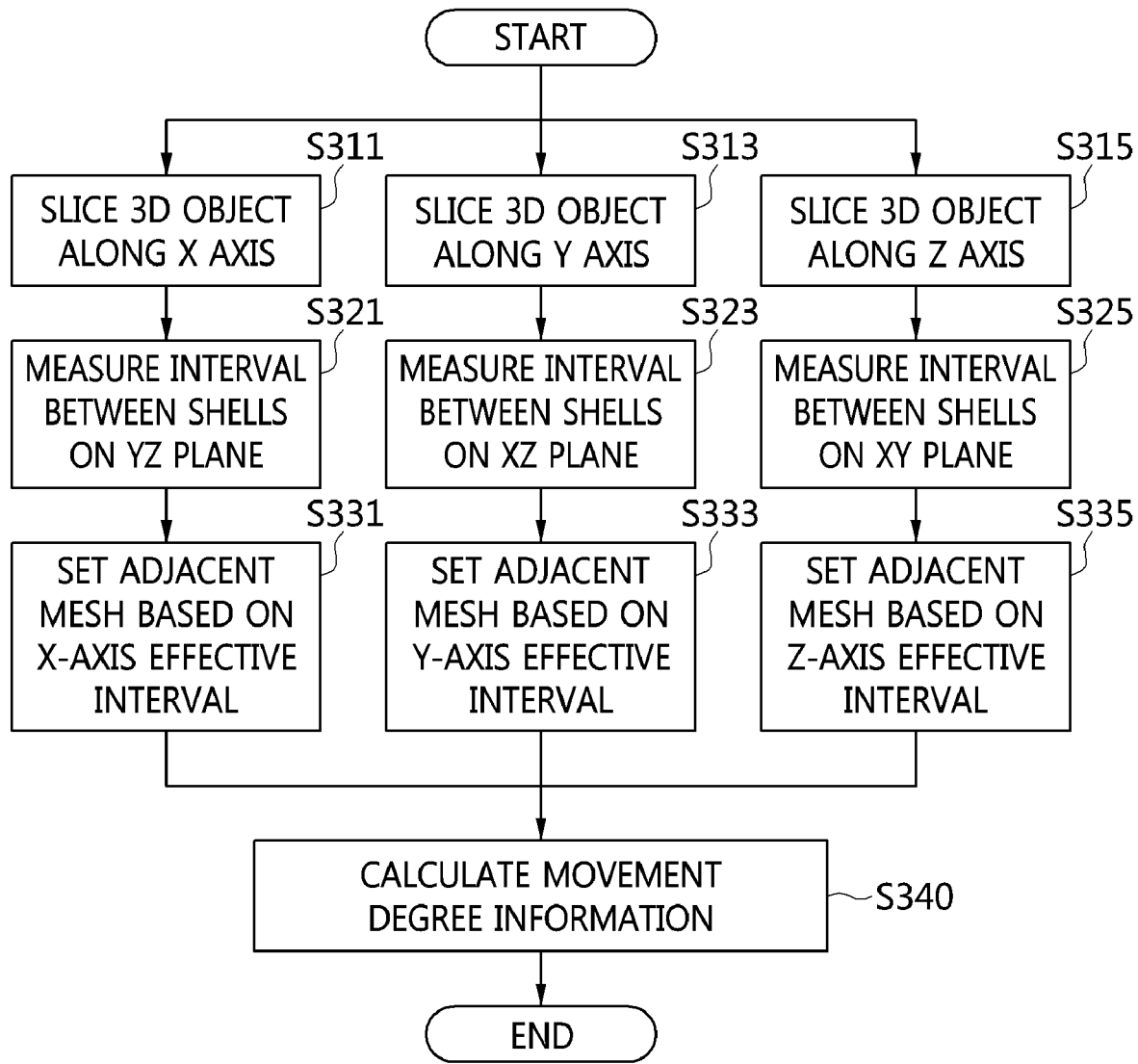
FIG. 3 is a flowchart illustrating a procedure for setting an adjacent mesh at step S210 of FIG. 2.

FIG. 3 is a flowchart illustrating a procedure for setting the adjacent meshes at step S210 of FIG. 2.

The 3D object print position correction apparatus 100 slices a 3D object along an X axis, a Y axis, and a Z axis at steps S311 to S315.

The 3D object print position correction apparatus 100 may slice the shell of the 3D object along the X axis (i.e. YZ plane) at step S311, along the Y axis (i.e. XZ plane) at step S313, and along the Z axis (XY plane) at step S315.

Steps S311, S313, and S315 may be performed either temporally independent of each other or sequentially according to a predetermined sequence, and the sequence in which steps S311 to S315 are performed is not limited by the example of FIG. 3.

Figure 4:
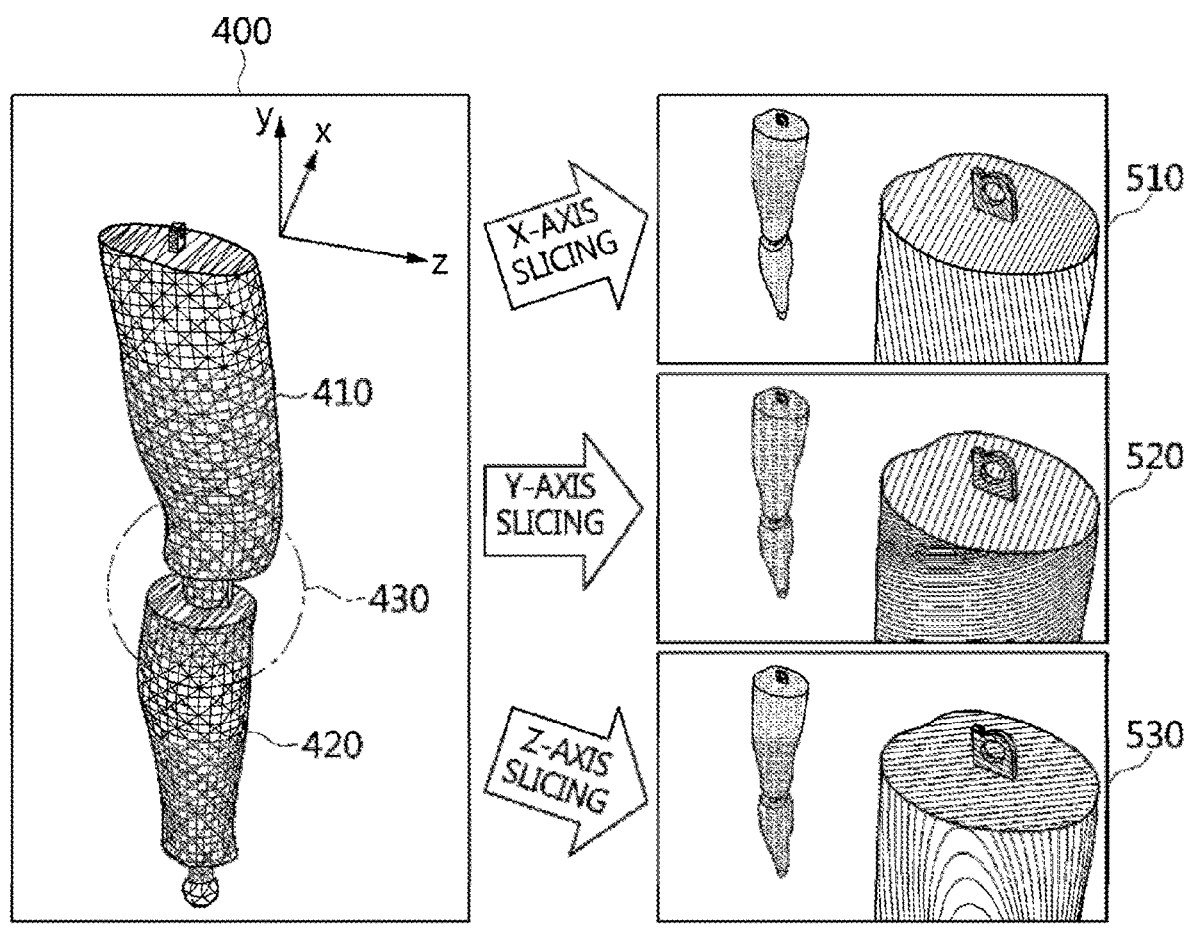
FIGS. 4 and 5 are example diagrams for explaining a procedure for slicing a 3D object at steps S311 to S315 of FIG. 3.
Figure 5:
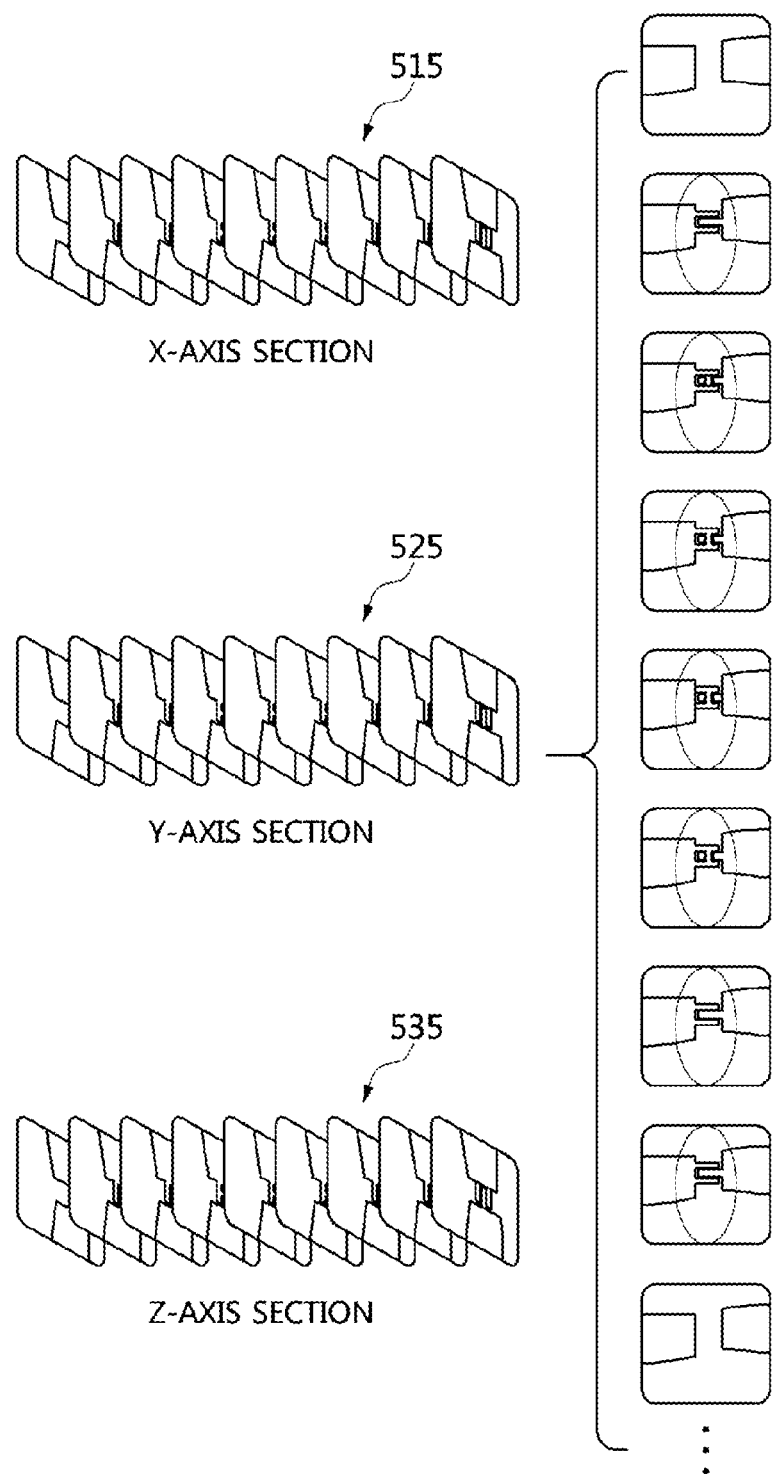

FIGS. 4 and 5 are example diagrams for explaining a procedure for slicing the 3D object at steps S311 to S315 of FIG. 3.

As illustrated in FIG. 4, it is assumed that a 3D object 400 is a model representing the leg of a person and has a shape in which a first shell 410, which is a shell indicating a thigh, and a second shell 420, which is a shell indicating a calf, are connected to each other through a joint structure 430. Here, meshes may be separated rather than being connected to the first shell 410 and to the second shell 420, and the 3D object 400 may be composed of one or more files depending on the joint structure 430.

The 3D object print position correction apparatus 100 may slice the 3D object 400 including the first shell 410 and the second shell 420 along the X axis, the Y axis and the Z axis (510, 520, and 530) at steps S311 to S315. Further, the 3D object print position correction apparatus 100 generates multiple X-axis sections 515, Y-axis sections 525, and Z-axis sections 535, as illustrated in FIG. 5, by slicing the 3D object 400 along the X axis, Y axis, and Z axis (510, 520, and 530).

Referring back to FIG. 3, the 3D object print position correction apparatus 100 measures intervals between shells at the sliced sections at steps S321 to S325.

In detail, the 3D object print position correction apparatus 100 may measure the interval between the shells at each YZ slice section sliced along the X axis at step S321, may measure the interval between the shells at each XZ slice section sliced along the Y axis at step S323, and may measure the interval between the shells at each XY slice section sliced along the Z axis at step S325.

Here, steps S321, S323, and S325 may be operated either temporally independent of each other or sequentially according to a predetermined sequence, and the sequence in which steps S321 to S325 are performed is not limited to the example of FIG. 3.

Next, the 3D object print position correction apparatus 100 sets adjacent meshes based on preset effective intervals at steps S331 to S335.

In detail, the 3D object print position correction apparatus 100 may set an adjacent mesh at the YZ slice section based on an X-axis effective interval at step S331, may set an adjacent mesh at the XZ slice section based on a Y-axis effective interval at step S333, and may set an adjacent mesh at the XY slice section based on a Z-axis effective interval at step S335.

The 3D object print position correction apparatus 100 may set the adjacent meshes at the X-axis, Y-axis, and Z-axis sections 515, 525, and 535 illustrated in FIG. 5.

When the interval between the first mesh of the first shell 410 and the second shell 420 is less than an effective interval, the 3D object print position correction apparatus 100 may set the corresponding first mesh as an adjacent mesh.

Further, when an interval between the third mesh of the first shell and the second mesh of the second shell 420 is less than an effective interval, the 3D object print position correction apparatus 100 may set the second mesh and the third mesh as adjacent meshes.

Here, for the effective intervals, the X-axis, Y-axis, and Z-axis effective intervals may be equally set, or may be set to respectively different values for the X axis, Y axis, and Z axis. Also, the effective intervals may be values that are set based on printing precision (e.g. X, Y, and Z resolutions) of the 3D printer that prints the 3D object, or values that are experimentally derived through actual printing tests.

In particular, in the case of low-priced 3D printers, there are many cases where supported printing precision is different from the precision of an actual output. Therefore, the 3D object print position correction apparatus 100 may set effective intervals based on values that are experimentally derived through actual printing tests.

In FIG. 3, after the procedure for setting the adjacent meshes at steps S331 to S335 has been performed, the 3D object print position correction apparatus 100 performs a procedure for calculating movement degree information using the set adjacent meshes at step S340. Here, the procedure for calculating the movement degree information using the set adjacent meshes may correspond to step S220 of FIG. 2, which will be described later.

Referring back to FIG. 2, the 3D object print position correction apparatus 100 calculates movement degree information of the joint structure included in the 3D object at step S220.

After the adjacent meshes of the 3D object have been set through step S210 and the procedure of FIG. 3, the 3D object print position correction apparatus 100 may calculate the movement degree information of the first shell and the second shell from the joint regions of the 3D object.

As illustrated in FIG. 4, when the first shell 410, corresponding to a thigh, and the second shell 420, corresponding to a calf, are connected to each other through the joint structure 430, the 3D object print position correction apparatus 100 calculates movement degree information of the joint structure so as to enable the action (motion) of the thigh and the calf desired by the user.

When the interval between the shells constituting the 3D object is excessively short, there is a limitation in the motion of the joint structure, whereas when the interval between the shells is excessively long, the joint structure may be loosened, thus leading to motion undesired by the user or causing separation of shells forming the joint structure. Therefore, in order to solve this problem, the 3D object print position correction apparatus 100 may calculate the movement degree information of the 3D object, and may then correct the print position of the 3D object.

Figure 6:
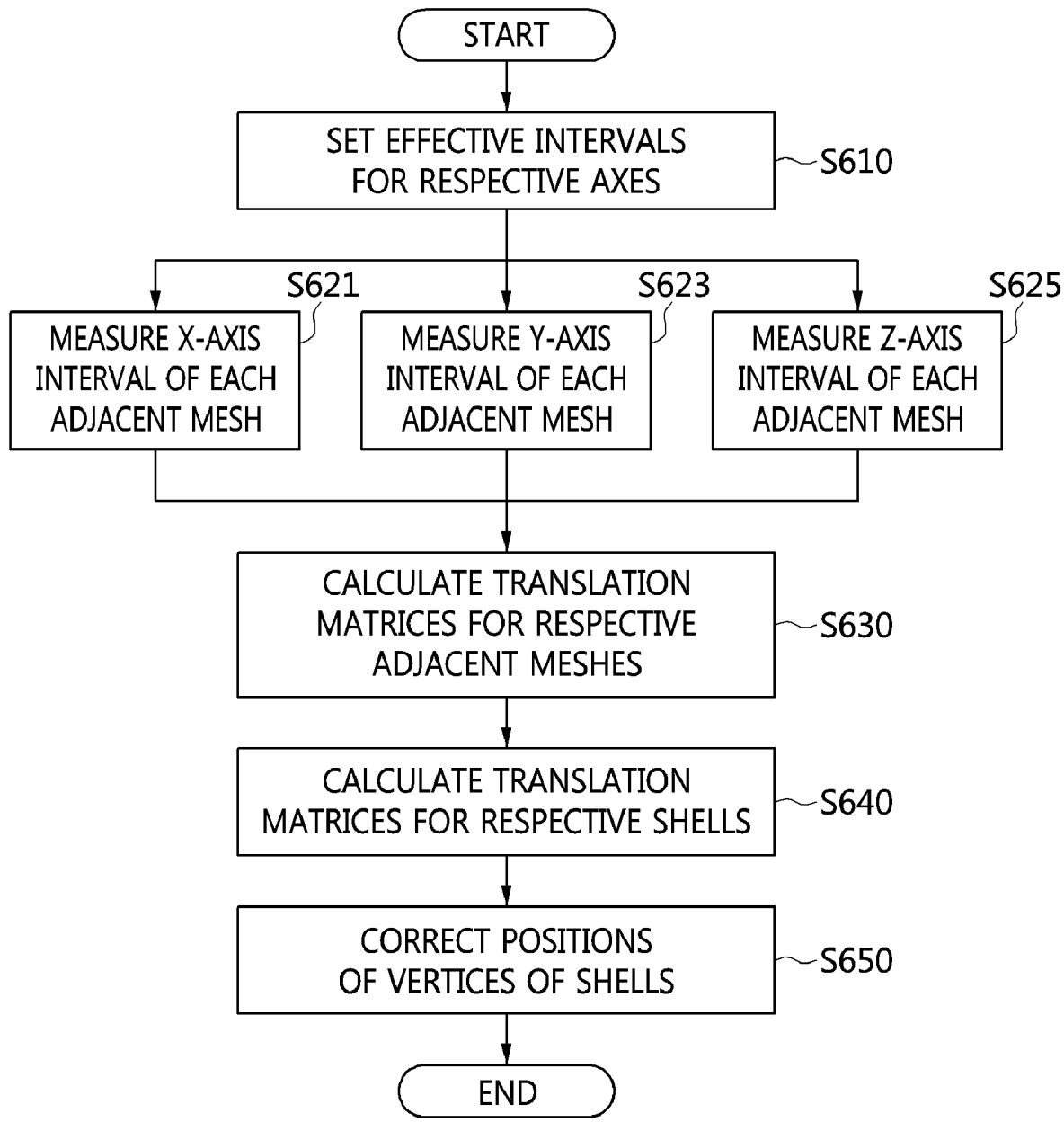
FIG. 6 is a flowchart illustrating a procedure for calculating movement degree information of a 3D object at step S220 of FIG. 2.

FIG. 6 is a flowchart illustrating a procedure for calculating the movement degree information of the 3D object at step S220 of FIG. 6.

The 3D object print position correction apparatus 100 sets effective intervals for respective axes at step S610.

For convenience of description, the 3D object print position correction apparatus 100 has been described as performing the procedure for setting the effective intervals for respective axes. However, when the effective intervals for respective axes are preset, the 3D object print position correction apparatus 100 may omit the performance of step S610.

Here, the effective intervals may be set based on the printing precision of the 3D printer that 3D-prints the 3D object, or may be set based on experiments. Also, the effective intervals may be set depending on the resolution of the 3D printer, the 3D printing material used thereby, etc. The effective intervals for respective axes may be equal to or different from each other.

Next, the 3D object print position correction apparatus 100 measures the X-axis interval, Y-axis interval, and Z-axis interval of each adjacent mesh at steps S621 to S625.

The 3D object print position correction apparatus 100 may measure the X-axis interval, the Y-axis interval, and the Z-axis interval of each adjacent mesh in order to move the shells of the 3D object based on the intervals of the adjacent meshes.

Next, the 3D object print position correction apparatus 100 calculates translation matrices for respective adjacent meshes at step S630.

The 3D object print position correction apparatus 100 may calculate translation matrices for respective adjacent meshes in units of adjacent meshes using the intervals between the shells at respective axis sections of a 3D space. Here, the number of translation matrices for respective adjacent meshes that are generated may be equal to the number of adjacent meshes.

Thereafter, the 3D object print position correction apparatus 100 calculates translation matrices for respective shells at step S640.

The 3D object print position correction apparatus 100 may calculate translation matrices for moving a single shell or all shells connected through the joint structure, and may calculate translation matrices for respective shells depending on the distribution of translation matrices for respective adjacent meshes.

Next, the 3D object print position correction apparatus 100 may perform the procedure for correcting the positions of the vertices of the shells at step S650. The procedure for correcting the positions of the vertices of the shells may correspond to step S230 of FIG. 2, which will be described later.

Referring back to FIG. 2, the 3D object print position correction apparatus 100 corrects the print position of the 3D object at step S230.

In order to enable the motion of the 3D object desired by the user by forming intervals between active joints depending on the joint motion of the first shell 410 and the second shell 420 constituting the 3D object 400, the 3D object print position correction apparatus 100 may correct the print position of the 3D object 400 by applying the translation matrices for respective shells generated at step S640 of FIG. 6 to the shells.

Here, the 3D object print position correction apparatus 100 may correct the print positions at which the shells 410 and 420 constituting the 3D object 400 are 3D printed by applying the translation matrices for respective shells to the positions of the vertices that form the meshes of the shells 410 and 420.

In this way, by geometrically and automatically transforming the 3D object 400 based on the intervals supported by the 3D printer and then correcting the print position of the 3D object 400, the 3D object print position correction apparatus 100 may support the motion of the joint structure 430 which connects the first shell 410 to the second shell 420, and may produce print output of the 3D object that enables the motion desired by the user to be implemented.

Also, the 3D object print position correction apparatus 100 may print the 3D object 400 all at once, rather than independently printing joints between the shells 410 and 420 constituting the 3D object 400, and may provide movement degree information so that, before 3D printing is performed, the user may determine the extent of motion of the joint structure 430. Further, the 3D object print position correction apparatus 100 may 3D-print the 3D object in consideration of the extent of motion received from the user.

Finally, the 3D object print position correction apparatus 100 converts the mesh data of the 3D object into toolpath information at step S240, and transmits the toolpath information of the 3D object to the 3D printer at step S250.

For convenience of description, the 3D object print position correction apparatus 100 has been described as correcting the print position of the 3D object at step S230 of FIG. 2 and requesting the printing of the 3D object from the 3D printer at steps S240 and S250. However, the present invention is not limited thereto, and the 3D object print position correction apparatus 100 may perform step S230, and may then perform the procedure for providing the results of simulating the corrected print position of the 3D object to the user, receiving revision information for the print position of the 3D object from the user, and reflecting the revision information in 3D printing.

Figure 7:
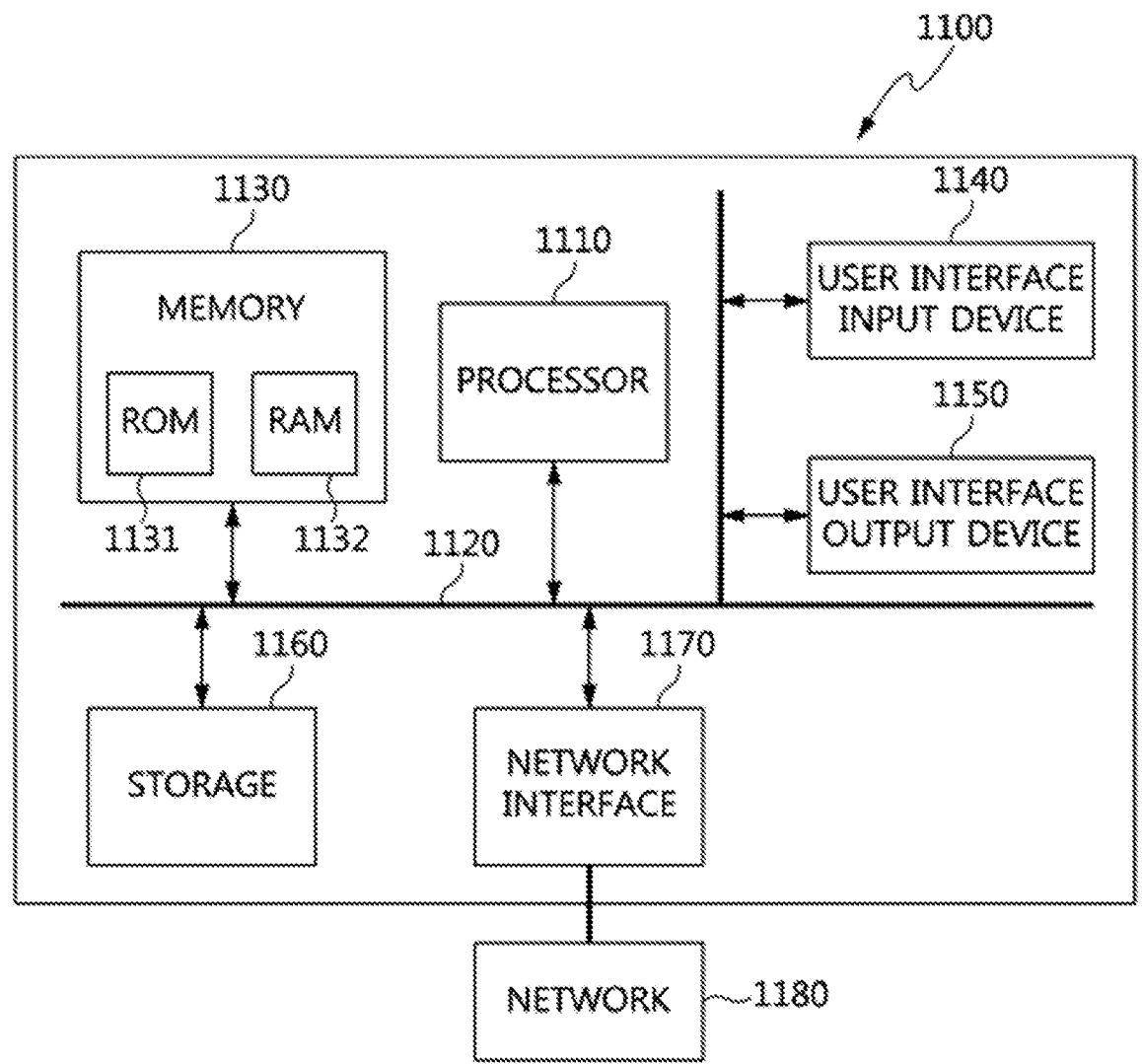
FIG. 7 is a block diagram illustrating a computer system according to an embodiment of the present invention.

FIG. 7 is a block diagram illustrating a computer system according to an embodiment of the present invention.

Referring to FIG. 7, the embodiment of the present invention may be implemented in a computer system 1100 such as a computer-readable storage medium. As shown in FIG. 7, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Therefore, the embodiment of the present invention may be implemented as a non-transitory computer-readable medium in which a computer-implemented method is recorded or in which computer-executable instructions are recorded. When the computer-executable instructions are executed by the processor, the instructions may perform the method according to at least one aspect of the present invention.

In accordance with the present invention, it may be determined, at a 3D mesh model step, whether a 3D mesh object reflects the motion functionality desired by a user.

In accordance with the present invention, 3D output that enables a user's desired motion to be implemented may be provided by forming intervals between active joints of multiple shells.

In accordance with the present invention, the extent of motion of a 3D object may be predicted before the 3D object is printed by a 3D printer.

In accordance with the present invention, a 3D object may be geometrically and automatically transformed based on intervals supported by a 3D printer.

As described above, in the apparatus and method for correcting the print position of a 3D object according to the present invention, the configurations and schemes in the above-described embodiments are not limitedly applied, and some or all of the above embodiments can be selectively combined and configured such that various modifications are possible.

What is claimed is:

1. A method for correcting a print position of a three-dimensional (3D) object, the method being performed by a 3D object print position correction apparatus, the method comprising:
    setting at least one adjacent mesh of a 3D object in which multiple shells are connected to each other through a joint structure;
    calculating movement degree information for the joint structure of the 3D object using the set adjacent mesh; and
    correcting a print position of the 3D object such that the print position matches the calculated movement degree information.

2. The method of claim 1, wherein setting the adjacent mesh of the 3D object is configured to set the adjacent mesh for a joint portion between a first shell and a second shell.

3. The method of claim 2, wherein setting the adjacent mesh of the 3D object comprises:
    slicing the 3D object along at least one of an X axis, a Y axis, and a Z axis;
    measuring an interval between the first shell and the second shell at a section of the sliced 3D object; and
    setting the adjacent mesh by comparing the measured interval with a preset effective interval.

4. The method of claim 3, wherein setting the adjacent mesh comprises setting at least one of an index of the adjacent mesh, indices of vertices corresponding to the adjacent mesh, coordinates of the vertices corresponding to the adjacent mesh, and a sequence of the indices of the vertices.

5. The method of claim 3, wherein the effective interval is set based on a printing precision of a 3D printer.

6. The method of claim 3, wherein calculating the movement degree information is configured to calculate the movement degree information based on at least one of a distribution and a size of the set adjacent mesh.

7. The method of claim 1, wherein calculating the movement degree information comprises:
   calculating a first translation matrix, which is a translation matrix for each adjacent mesh; and
   calculating a second translation matrix, which is a translation matrix for each shell.

8. The method of claim 7, wherein calculating the second translation matrix is configured to calculate the second translation matrix for at least one of a first shell and a second shell based on a distribution of the first translation matrix.

9. The method of claim 7, wherein correcting the print position of the 3D object is configured to correct positions of vertices corresponding to each shell based on the first translation matrix and the second translation matrix.

10. The method of claim 1, further comprising:
    converting mesh data of the 3D object, the print position of which is corrected, into toolpath information; and
    transmitting the toolpath information to a 3D printer.

11. An apparatus for correcting a print position of a three-dimensional (3D) object, comprising:
    an adjacent mesh (shell) setting unit for setting at least one adjacent mesh of a 3D object in which multiple shells are connected to each other through a joint structure;
    a joint movement degree estimation unit for calculating movement degree information for the joint structure of the 3D object using the set adjacent mesh; and
    a print position correction unit for correcting a print position of the 3D object such that the print position matches the calculated movement degree information.

12. The apparatus of claim 11, wherein the adjacent mesh (shell) setting unit sets the adjacent mesh for a joint portion between a first shell and a second shell.

13. The apparatus of claim 12, wherein the adjacent mesh (shell) setting unit slices the 3D object along at least one of an X axis, a Y axis, and a Z axis, measures an interval between the first shell and the second shell at a section of the sliced 3D object, and sets the adjacent mesh by comparing the measured interval with a preset effective interval.

14. The apparatus of claim 13, wherein the adjacent mesh (shell) setting unit sets at least one of an index of the adjacent mesh, indices of vertices corresponding to the adjacent mesh, coordinates of the vertices corresponding to the adjacent mesh, and a sequence of the indices of the vertices.

15. The apparatus of claim 13, wherein the effective interval is set based on a printing precision of a 3D printer.

16. The apparatus of claim 13, wherein the joint movement degree estimation unit calculates the movement degree information based on at least one of a distribution and a size of the set adjacent mesh.

17. The apparatus of claim 11, wherein the joint movement degree estimation unit calculates a first translation matrix, which is a translation matrix for each adjacent mesh, and calculates a second translation matrix, which is a translation matrix for each shell.

18. The apparatus of claim 17, wherein the joint movement degree estimation unit calculates the second translation matrix for at least one of a first shell and a second shell based on a distribution of the first translation matrix.

19. The apparatus of claim 17, wherein the print position correction unit corrects positions of vertices corresponding to each shell based on the first translation matrix and the second translation matrix.

20. The apparatus of claim 11, further comprising a 3D printer control unit for converting mesh data of the 3D object, the print position of which is corrected, into toolpath information and transmitting the toolpath information to a 3D printer.

* * * * *